United States Patent [19]

Benjamin

[11] 3,966,350
[45] June 29, 1976

[54] SPADE DRILL
[75] Inventor: Milton L. Benjamin, Chagrin Falls, Ohio
[73] Assignee: Erickson Tool Company, Solon, Ohio
[22] Filed: Feb. 24, 1975
[21] Appl. No.: 552,696

[52] U.S. Cl. .............................. 408/233; 408/211; 408/239 R
[51] Int. Cl.² ........................................ B23B 51/00
[58] Field of Search .......... 408/211, 114, 239, 200, 408/233

[56] References Cited
UNITED STATES PATENTS

| | | | |
|---|---|---|---|
| 2,400,856 | 5/1946 | Thompson | 408/239 X |
| 2,971,409 | 2/1961 | Peters et al. | 408/200 X |
| 3,076,357 | 2/1963 | Benjamin et al. | 408/211 |
| 3,667,768 | 6/1972 | Stokey | 408/239 X |

FOREIGN PATENTS OR APPLICATIONS

| | | | |
|---|---|---|---|
| 955,696 | 1/1950 | France | 408/211 |
| 382,969 | 12/1964 | Switzerland | 408/211 |
| 345,922 | 4/1931 | United Kingdom | 400/211 |

*Primary Examiner*—Othell M. Simpson
*Assistant Examiner*—W. R. Briggs
*Attorney, Agent, or Firm*—Donnelly, Maky, Renner & Otto

[57] ABSTRACT

A spade drill characterized in that the slotted blade clamping end of the holder has non-symmetrical oppositely disposed blade clamping faces, each of which extends close to the cutting end and cutting diameter of the blade on the side of the blade opposite to the side containing one cutting edge thus to provide firm support for said one cutting edge and is beveled at its end to provide a wide divergent passage for free passage of chips from the other cutting edge to the longitudinal obtuse angle groove of the holder which intersects such divergent passage at its wide end.

4 Claims, 4 Drawing Figures

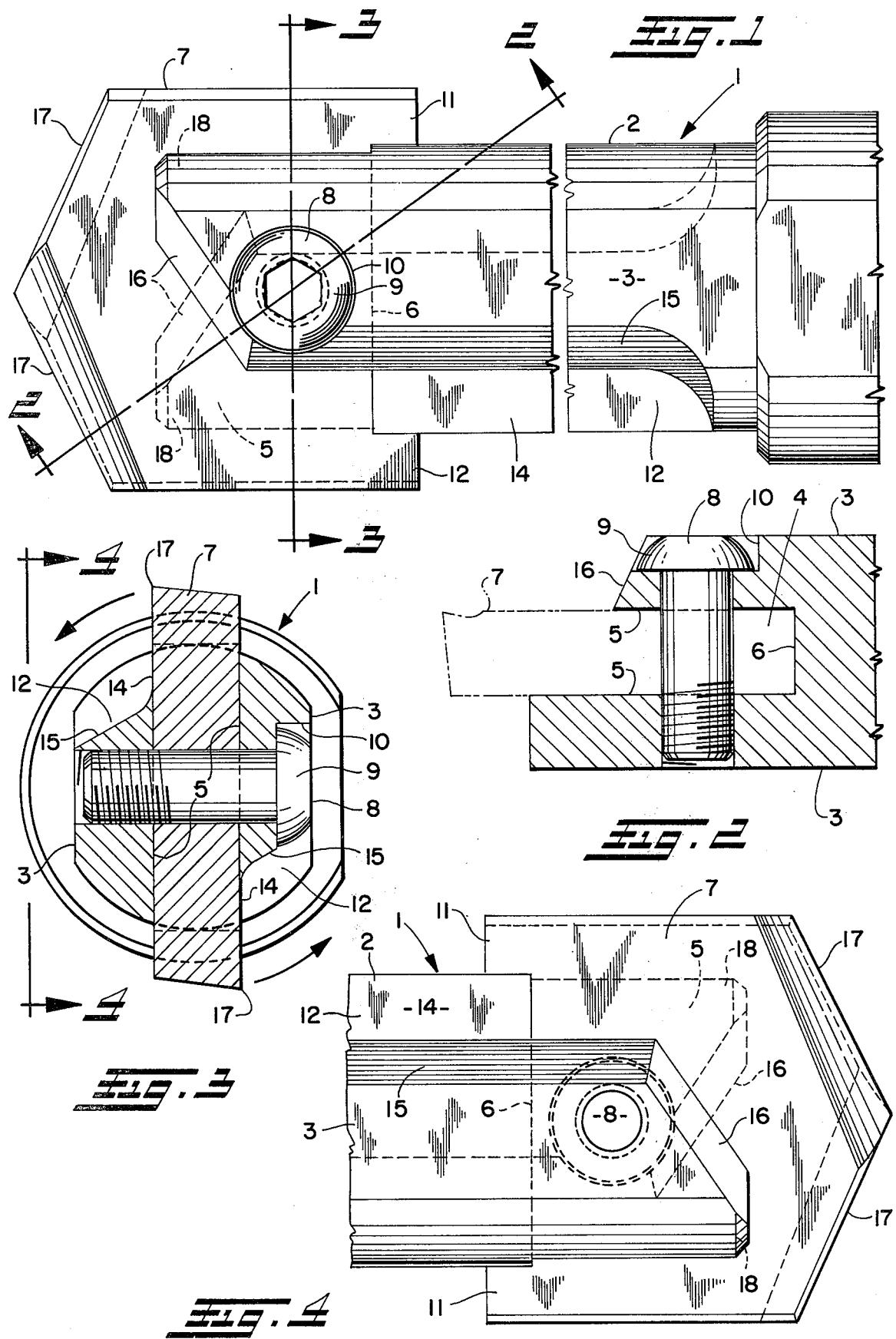

SPADE DRILL

BACKGROUND OF THE INVENTION

In known spade drills such as disclosed in the U.S. Pat. Nos. 3,049,033, 3,076,357, 3,658,434, and 3,776,656, the holder is of cylindrical form with diametrically opposed longitudinally extending grooves for chips, and the blade clamping slot at the end of the holder has plane faces which are symmetrical about their longitudinal center lines whereby the blade, when clamped in the holder, must have substantial axial overhang with respect to ends of such blade clamping faces in order to provide adequate chip clearance between the cutting edges and the ends of the holder. Moreover, in such known spade drills the holder is provided with parallel flats adjacent the bottom of the blade clamping slot which are engaged by corresponding parallel plane faces on the blade to center the blade with respect to the holder.

In the U.S. Pat. Nos. 3,658,434 and 3,776,656, the slotted end of the holder is beveled or chamfered on both sides of each clamping face thus sacrificing rigidity of the blade clamping and again providing the relatively large axial overhang of the cutting edges with respect to the cutting load supporting zones of said clamping faces.

SUMMARY OF THE INVENTION

In contradistinction to the foregoing the present spade drill is of compact construction providing strong support for the spade drill blade clamped therein and providing large size passages for free flow of chips.

Other objects and advantages will appear from the ensuing description.

BRIEF DESCRIPTION OF THE DRAWING

FIG. 1 is a side elevation view of a spade drill embodying the present invention;

FIGS. 2 and 3 are cross-section views taken substantially along the lines 2—2 and 3—3, FIG. 1; and FIG. 4 is an elevation view taken substantially along the line 4—4, FIG. 3.

DETAILED DESCRIPTION OF A PREFERRED EMBODIMENT

The spade drill 1 herein comprises a holder 2 which is of cylindrical form with parallel longitudinally extending flats 3 on opposite sides thereof. The end of the holder 2 is formed with a slot 4 having opposite sides or clamping faces 5 which are parallel to the flats 3 and a bottom 6 which is perpendicular to the axis of the holder 2, the width of the slot 4 between faces 5 being substantially equal to the thickness of the spade drill blade 7 which is adapted to be clamped between said faces 5 by means of the screw 8 preferably a buttonhead screw as shown. As evident, when the screw 8 is tightened its head 9 bears on the bottom of the counter bore 10 and draws the faces 5 into tight frictional engagement with opposite sides of said blade 7. The shank of the screw 8 extends through a hole in the blade 7 as is well known in the art and the diameter of the holder 2 is substantially equal to the distance between the blade extensions 11 so that the blade will be accurately located in centered position with its longitudinal axis aligned with the axis of the holder 2. Each side of the holder 2 has an angular longitudinally extending groove 12 which in cross-section is of obtuse angle with one side 14 being substantialy flush with the corresponding side of the blade 7 and with the other side 15 intersecting the respective flat 3 and extending beyond the bottom 6 of the slot 4 so as to be substantially tangent to the head 9 of the clamping screw 8 on one side of the holder 2 (see FIGS. 1 and 3). On the other side of the holder 2, the side 15 of groove 12 also extends beyond the bottom 6 of the slot and intersects the flat 3 at substantially the thread diameter (see FIGS. 3 and 4). By way of illustrative example, the included angle of the groove 12 may be at 120°.

As best shown in FIGS. 1, 2 and 3, the holder 2 on opposite sides of the slot 4 has beveled ends 16 which intersect the inclined side 15 of the groove 12 and which on one side is substantially tangent to the head 9 of the screw 8 (see FIG. 2). In the case of a spade drill blade 7 having a pointed cutting end with cutting edges 17 as shown, the angle of the beveled end 16 will preferably be greater than the angle of the cutting edge so as to form a divergent passage for facilitating the flow of chips when the spade drill 1 is in use. Moreover, the beveled ends 16 are inclined at an angle of about 25°, for example, to form obtuse angle chip flow passages of 115° angle.

When the spade drill 1 is rotated in the direction indicated by the arrows in FIG. 3, the torque load on each cutting edge 17 is supported in the zone 18 of the side 5 of the slot 4 which is near the cutting end and near the cutting radius but on the side of the blade 7 opposite the cutting edge 17. The sides of the slot 4 which engage the sides on which the cutting edges 17 are located are beveled as at 16 to form large size obtuse angle chip flow channels, one beveled end 16 and one side 15 of the adjacent groove 12 being substantially tangent to the head 9 of the buttonhead screw 8 so that the head 9 does not impede the flow of chips.

Furthermore, by reason of the flats 3 on opposite sides of the cylindrical holder 2, the slotted end portion is rendered more readily flexible for firm gripping of the blade 7 while using a buttonhead screw 8 which has a head 9 of relatively small thickness.

It can be seen that the spade drill 1 herein may be used in conjunction with blades 7 of minimum diameter and minimum axial length. If desired, the blade 7 diameter may be only slightly larger than the diameter of the holder 2 and similarly the blade 7 may be shorter than shown with the cutting edges 17 disposed nearer to the end of the slotted end of the holder 2. Even with such smaller diameter and shorter blade 7, the chip passages would yet be of large size to provide for free flow of chips out of the hole which is being drilled.

I, therefore, particularly point out and distinctly claim as my invention:

1. In a spade drill wherein a holder has a slot extending diametrically across one end thereof, and a blade is clamped in said slot by screw means with its cutting edges disposed axially forwardly of the open end of said slot and with its other end in abutting engagement with the bottom of said slot, the improvement which comprises oppositely beveled straight and flat end portions on said holder which are inclined with respect to the adjacent sides of said blade and which respectively extend from the open end of said slot from a substantial distance beyond the longitudinal center line of said blade angularly toward the bottom of said slot to the other side of said longitudindal center line thus to form with the adjacent sides of said blade passages of obtuse angle cross section which diverge with respect to said cutting edges for flow of chips from said cutting edges when the spade drill is in use; said inclined beveled end portions leaving narrow remaining end portions which support the respective cutting edges against torque load from the bottom of said slot to the open end thereof at said remaining end portions; said holder having longitudinally extending grooves which are of obtuse angle cross section with one side of said grooves being substantially flush with the respective side faces of said blade and with the other side of said grooves intersecting said beveled end portions to form longitudinal continuations of said passages.

2. The spade drill of claim 1 wherein said screw means comprises a button-head screw extending transversely through a hole in said blade and having threaded engagement with said holder on one side of said slot and having its head seated in a counterbore on the other side of the slot; said other side of one of said longitudinal grooves and the corresponding inclined beveled end portion being substantially tangent to said head.

3. The spade drill of claim 1 wherein said holder has diametrically opposite cylindrical surfaces in the regions of said slot and longitudinally beyond the bottom of said slot; and wherein said blade at said other end has longitudinal extensions with parallel internal flats spaced apart a distance substantially equal to the diameter of said of said cylindrical surfaces thus to center said blade with respect to said holder.

4. The spade drill of claim 3 wherein said holder has parallel longitudinal flats on opposite sides parallel to the sides of said slot and intersecting said cylindrical surfaces to impart additional flexibility to the slotted end portion of said holder.

* * * * *